United States Patent [19]

Kumagai

[11] Patent Number: 5,164,997
[45] Date of Patent: Nov. 17, 1992

[54] METHOD AND APPARATUS FOR ALIGNING IMAGES USING PIXELS OF CLOSED CONTOURS

[75] Inventor: Ryohei Kumagai, Tokyo, Japan

[73] Assignee: Ezel, Inc., Tokyo, Japan

[21] Appl. No.: 646,376

[22] Filed: Jan. 28, 1991

[30] Foreign Application Priority Data

Jan. 30, 1990 [JP] Japan ................................ 2-19682

[51] Int. Cl.⁵ ............................................... G06K 9/32
[52] U.S. Cl. ........................................ 382/46; 382/44; 382/45
[58] Field of Search .......................... 382/46, 44, 45; 356/375; 250/491.1

[56] References Cited

U.S. PATENT DOCUMENTS

| | | | |
|---|---|---|---|
| 4,199,815 | 4/1980 | Kyte et al. | 364/523 |
| 4,204,232 | 5/1980 | Mizuno | 358/260 |
| 4,539,704 | 9/1985 | Pastor | 382/55 |
| 4,566,124 | 1/1986 | Yamamoto et al. | 382/21 |
| 4,574,357 | 3/1986 | Pastor et al. | 364/518 |
| 4,593,406 | 6/1986 | Stone | 382/44 |
| 4,628,532 | 12/1986 | Stone et al. | 382/21 |
| 4,665,441 | 5/1987 | Sakaue et al. | 358/280 |
| 4,703,363 | 10/1987 | Kitamura | 358/284 |
| 4,748,676 | 5/1988 | Miyagawa et al. | 382/46 |
| 4,783,840 | 11/1988 | Song | 382/54 |
| 4,922,543 | 5/1990 | Ahlbom et al. | 382/48 |
| 4,949,390 | 8/1990 | Iverson et al. | 382/49 |
| 5,048,104 | 9/1991 | D'Aoust et al. | 382/46 |

FOREIGN PATENT DOCUMENTS 0062980   4/1984   Japan ................................ 382/46

OTHER PUBLICATIONS

Ueda et al, "Automatic Verification of Seal-Impression Pattern", Proceedings, 7th International Conference on Pattern Recognition, 1984, vol. 2, pp. 1019-1021, 1984.

Ueda et al, "Method of Pattern Positioning for Automatic Verification of Seal-Imprint", The Transaction of the Institute of Electronics and Communication Engineers of Japan, Section J, vol. 68, No. 11, pp. 1910-1917, 1985.

Azriel Rosenfeld and Avinash C. Kak, Digital Picture Processing, Second Edition, Computer Science and Applied Mathematics, vol. 2, pp. 138-145, 240-243.

Robert J. Schalkoff, Digital Image Processing and Computer Vision, An Introduction to Theory and Implementations, 1989, pp. 258-261.

Image Processing On Personal Computers, pp. 46-49, 298, 164-165 (Japanese).

(List continued on next page.)

*Primary Examiner*—Leo H. Boudreau
*Assistant Examiner*—Andrew W. Johns
*Attorney, Agent, or Firm*—Cushman, Darby & Cushman

[57] ABSTRACT

A method and apparatus for aligning first and second images uses closed contours of pixels from the images. In the preferred embodiment, a series of pixels is selected from along a contour in each image. The contours can be circles. The two pixel series are compared to determine a degree of concurrence. One series is shifted by one pixel relative to the other, and concurrence is determined after the shift. The series are shifted repeatedly until all shifts have been measured. The shift distance which results in the maximum concurrence is selected as a measure of the amount of rotation needed to align the images. After rotational alignment, one image is displaced by one relative to the other and the displaced images are compared to determine a degree of coincidence. The images are displaced eight times, each displacement testing one position in a different direction. When a displacement is found to give a higher degree of coincidence between the images, the images are displaced in that direction. The images are then displaced again and tested for coincidence until a displacement is found for which any displacement gives a lower degree of coincidence. After the images have been rotated and displaced, they are aligned.

12 Claims, 7 Drawing Sheets

OTHER PUBLICATIONS

Robert M. Haralick, K. Shanmugan, Its'hak Dinstein, Textural Features For Image Classification, IEEE Transactions on Systems, Man and Cybernetics, vol. SMC-3, No. 6, Nov. 1973, pp. 610–621.

Teuvo Kohonen, An Introduction to Neural Computing, Neural Networks, vol. 1, pp. 3–16, 1988.

Takashi Matsuyama, Part II Texture Analysis, A Separate Volume of O Plus E, New Technology Communications Co., Ltd., Nov. 1986, pp. 219–227 (Japanese).

Paul C. K. Kowk, A Thinning Algorithm by Contour Generation, Communications of the ACM, Nov. 1988, vol. 31, No. 11, pp. 1314–1324.

E. S. Deutsch, Thinning Algorithms on Rectangular, Hexagonal, and Triangular Arrays, Scientific Applications, 1972, pp. 827–837.

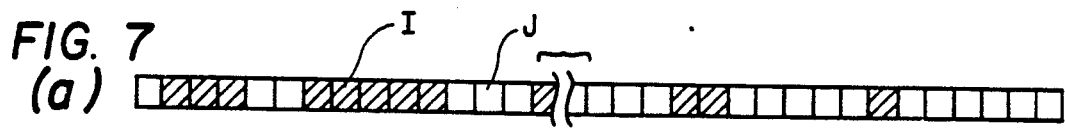
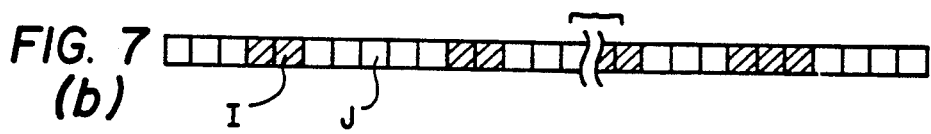
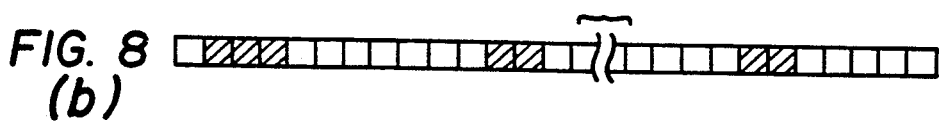
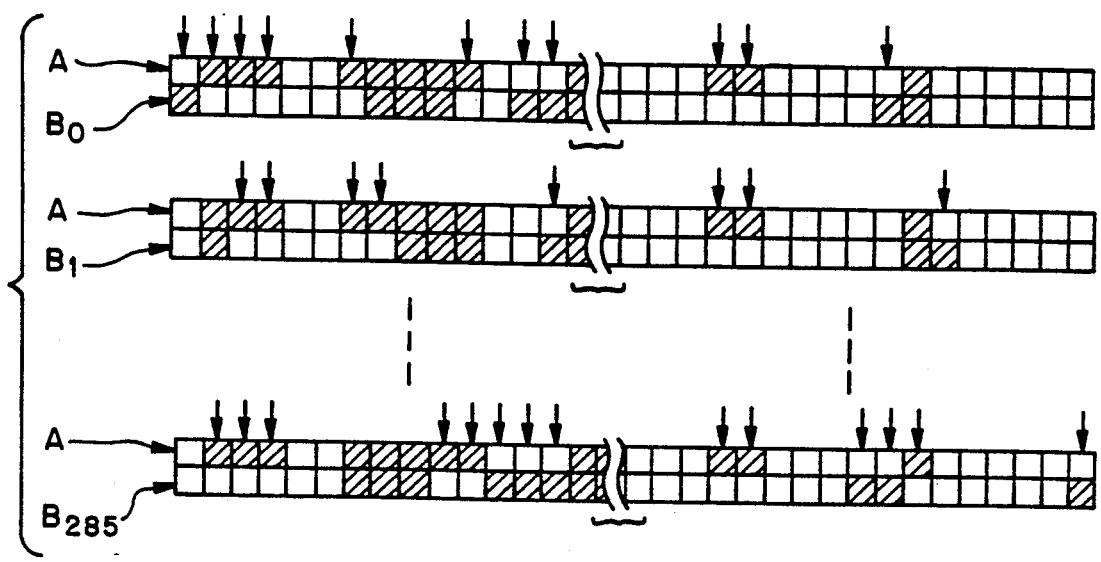
FIG. 1

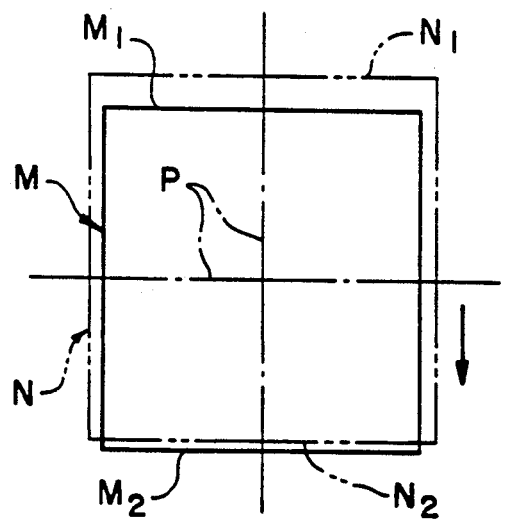
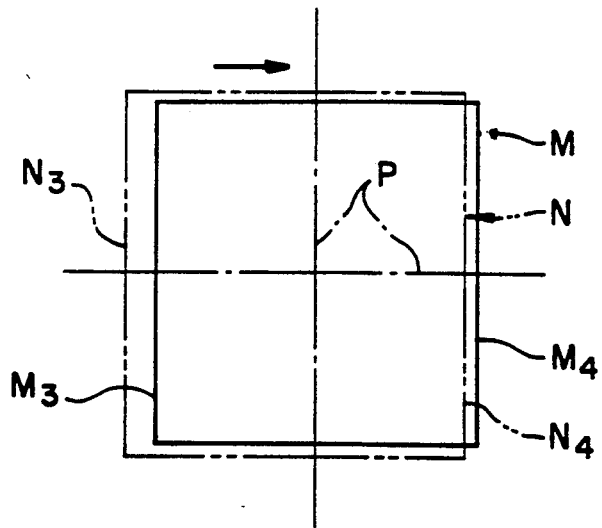
FIG.9(a)   FIG.9(b)
FIG. 10

METHOD AND APPARATUS FOR ALIGNING IMAGES USING PIXELS OF CLOSED CONTOURS

FIELD OF THE INVENTION

The present invention relates to a system for adjusting positions of registered (stored) and sample seal-imprints so as to verify them in a seal-imprint verification system.

BACKGROUND OF THE INVENTION

For judging whether a sample seal-imprint is the same as a registered one, the sample or the registered imprint is displaced or rotated before verification since a sample seal-imprint may have been sealed with a different posture from that of the registered one. The distance and directions of the movement must be calculated first in order to verify a seal-imprint. Conventionally, a sample seal-imprint is moved relative to the registered one so that an identification ratio becomes a maximum. Then the postures of the sample and registered one are deemed to be the same.

SUMMARY OF THE INVENTION

When all the pixels of a sample seal-imprint and a registered one are compared, verification is slow because of the large number of pixels to be processed.

The present invention adjusts position of a sample seal-imprint and a registered one in a way which achieves verification in a short time.

A position adjustment system comprises a means for extracting pixel data along a first circle in the first image; a means for extracting pixel data along a second circle, concentric with the first circle; a means for rotating the pixel data of the first and the second images relative to one another by a predetermined number of pixels; a means for detecting the rotation which gives the maximum identification ratio; and a means for comparing the first and second images with each other by rotating them by the angle and direction of the rotation.

BRIEF DESCRIPTION OF THE DRAWINGS

FIG. 1 is a diagram illustrating a comparison of a first series of pixels from a first image and a second series of a second image for each of a plurality of shift distances;

FIG. 7 (a) shows pixels taken from the outer circle of FIG. 6;

FIG. 7 (b) shows pixels taken along the inner circle of FIG. 6;

FIG. 8 (i a) shows pixels taken along an outside circle of sample seal-imprint to be processed;

FIG. 8 (b) shows pixels taken along the inside circle of sample seal-imprint to be processed;

FIG. 9 (a) illustrates parallel movement of a sample seal-imprint in up and down directions over a registered seal-imprint;

FIG. 9 (b) shows parallel movement of a sample seal-imprint in right and left directions over a registered seal-imprint;

FIG. 10 shows a 3×3 area for searching a position of overlap having a maximum identification ratio between sample seal-imprint and registered one;

PREFERRED EMBODIMENT OF THE PRESENT INVENTION

Hereinafter, an embodiment of the lighting system according to the present invention is described with reference to the attached drawings. The present invention is applied to a seal-imprint verification system.

Figure 2:
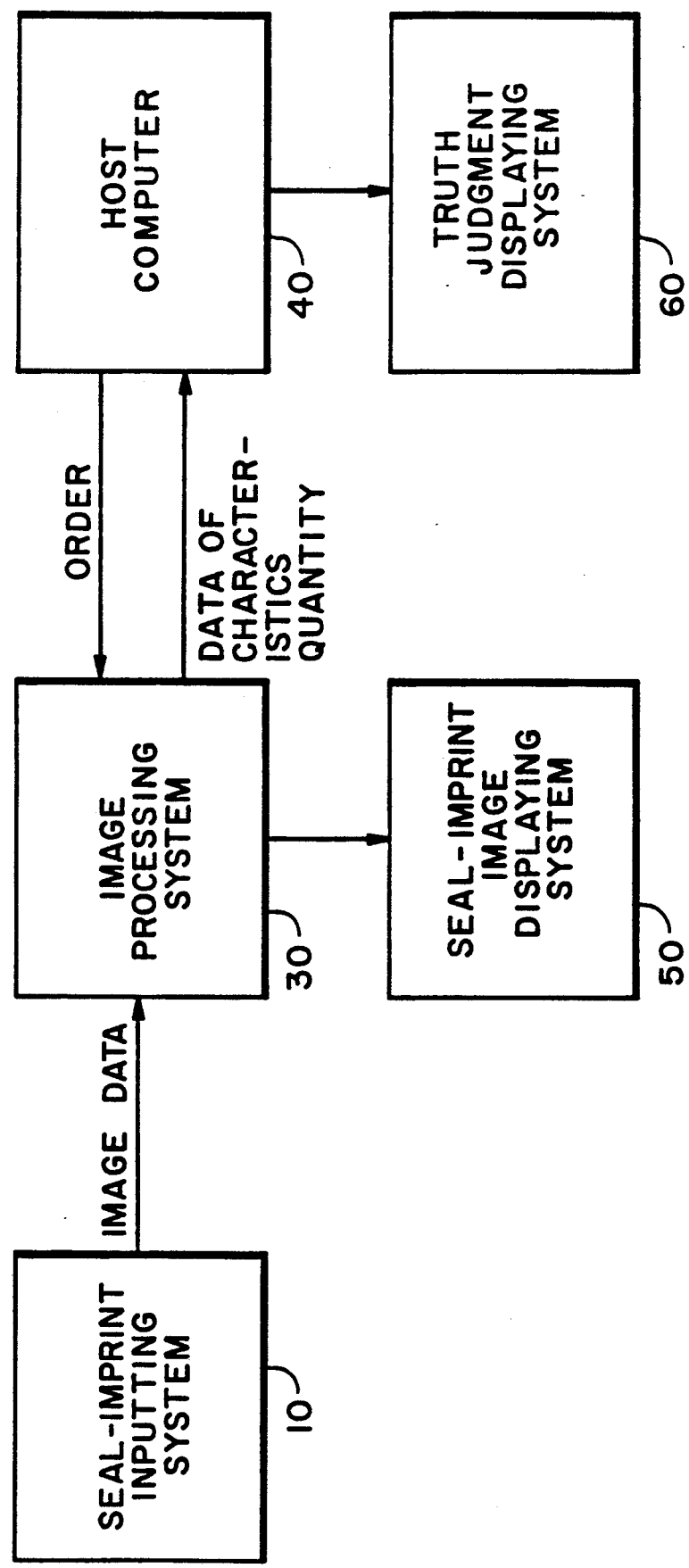
FIG. 2 is a block diagram of a seal-imprint verification system embodying the present invention.

FIG. 2 outlines a seal-imprint verification system. It comprises a seal-imprint input system 10, image processing system 30, host computer 40, seal-imprint image display system 50 and truth judgment system 60.

The seal-imprint input system 10 images a sample seal-imprint. The image is transmitted to the image processing system 30. In the image processing system 30, the characteristic values of the seal-imprint image are determined (e.g., seal-imprint area). Image processing system 30 works under control of the host computer 40 and outputs characteristic values of the seal-imprint image to the host computer 40. The host computer 40 controls the system. Simultaneously, it evaluates the characteristic values from the image processing system 30 and judges whether the sample seal-imprint agrees with a registered one. The seal-imprint display system 50 comprises a CRT connected to the image processing system 30 and displays a seal-imprint. Truth judgment system 60 comprises a CRT connected to the host computer 40 and displays the result of the judgment of whether (or not) a seal-imprint agrees with the registered one.

Figure 3:
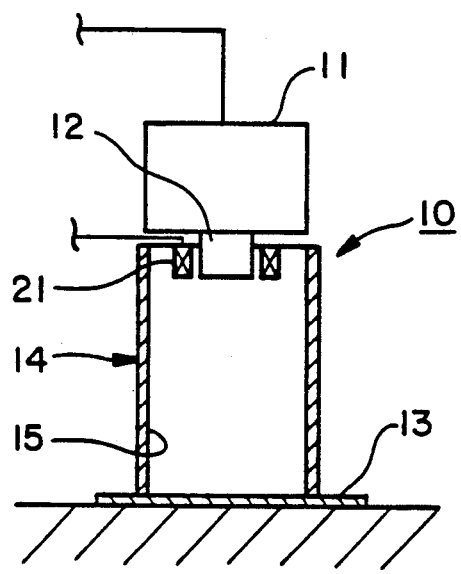
FIG. 3 shows a cross-section of a lighting system of the seal-imprint input system of FIG. 2.
Figure 4:
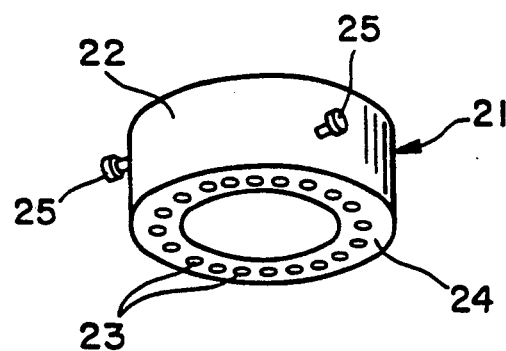
FIG. 4 shows a perspective view of a lighting structure from the lighting system of FIG. 3.

The seal-imprint input system 10 comprises a CCD camera 11, as shown in FIG. 3, whose lens is positioned in a lens barrel 12 which runs downward from the main body. The CCD camera 11 faces a paper 13 bearing a seal imprint. The CCD camera 11 can move parallel to the paper 13 and rotate about the axis of the lens. On the outside of the lens, that is on the lens barrel 12, a cylindrical irradiation mechanism 21 is positioned, which comprises optical fibers 23 as shown in FIG. 4. Optical fibers 23 are connected to a light source (not shown) such as a halogen lamp.

Cylindrical light shield material 14 is positioned around the camera 11 and the paper 13. Light shield material 14, whose upper edge is close to the body of camera 11, blocks outside light from the seal-imprint. The inner surface of light-shield material is covered by film 15 which reflects light, such as aluminum foil.

FIG. 4 shows the structure of the irradiation mechanism 21 which comprises a number of optical fibers 23 in a circular support material 22. These optical fibers 23 are arranged around the center of the lens-barrel 12. A blue filter 24, such as transparent cellophane, is positioned in the center of the lens on the top part of each optical fiber 23, that is, on the bottom part of support material 22. Blue light enhances contrast between a seal-imprint and the background paper because the seal-imprint is vermilion. Support material 22 is attached with the lens-barrel 12 of the camera 11 by screws 25.

In this way, the lighting system in the present invention comprises a circular irradiation mechanism 21 surrounding the lens of a camera 11, and light-shield material 14 limits outside light. Irradiating mechanism 21 is constructed to obtain a clear seal-imprint by irradiating blue light on to the paper 13. Therefore, it is possible to image an imprint sealed on paper 13 clearly and accurately.

Figure 5:
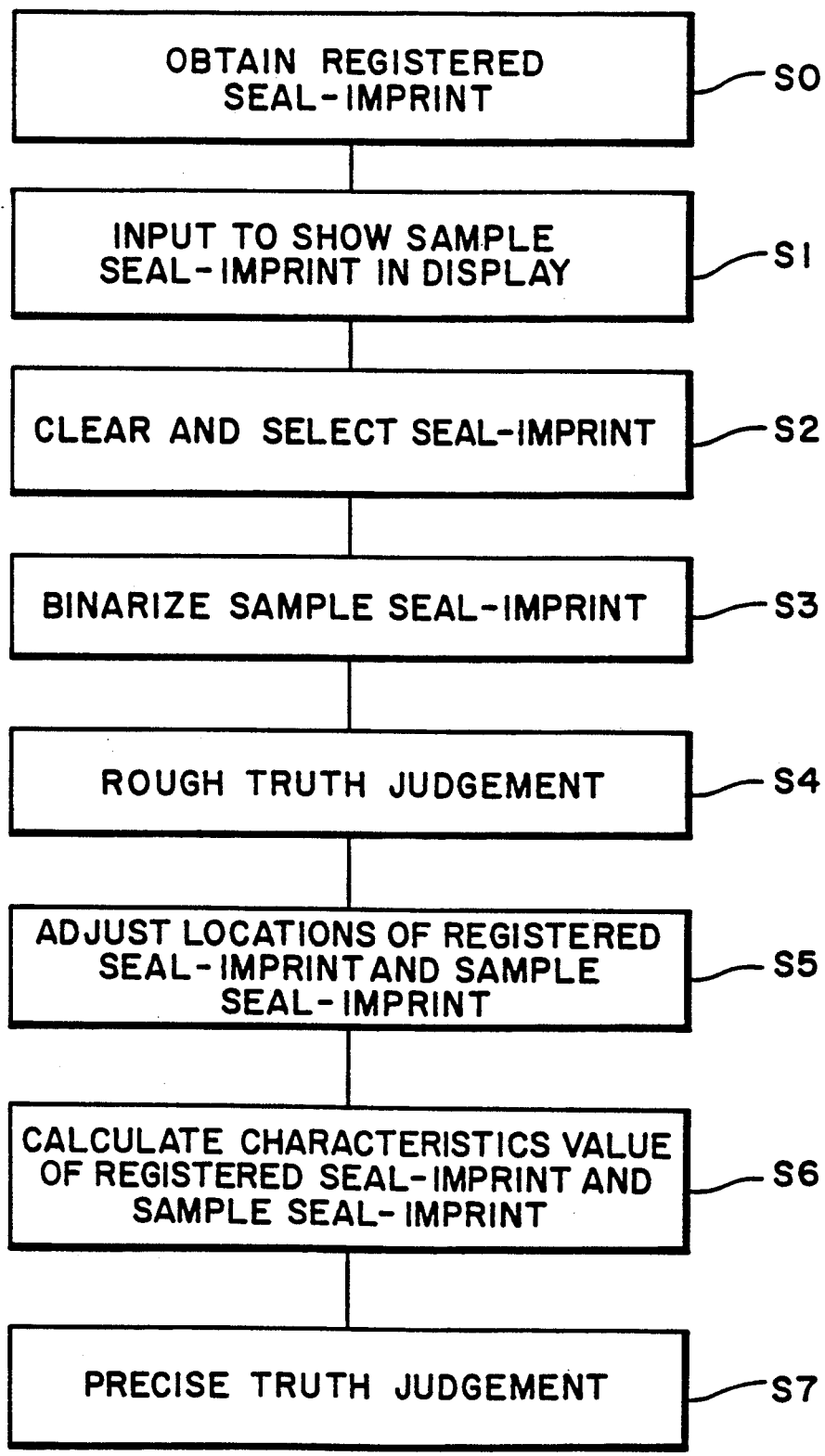
FIG. 5 shows a flowchart outlining a process for verification of seal-imprints using the present invention.

FIG. 5 outlines the process of seal-imprint verification. The outline is explained generally and then in more detail below.

In step S0, a registered imprint is obtained. It is obtained by imaging a sealed imprint by the CCD camera 11. The method is also used in steps S1, S2, S3 and S5, and imaging is described later.

In step S1, a sample seal-imprint to be verified is input to a display for comparison with the registered one. That is, after the CCD camera 11 images the sample seal-imprint, the sample seal-imprint is displayed on the CRT of the seal-imprint display system 50. In step S2, the sample seal-imprint is filtered by erasing the background and noise. In step S3, a monochrome gray-level image of the sample seal-imprint is converted into a black and white image.

In steps S4 and S6, the registered image and the sample image are compared. In step S4, it is judged roughly whether the sample seal-imprint is the same as the registered one based on the size and the number of pixels of the seal-imprints. When the sample seal-imprint is judged to be different from the registered one, verification is concluded. When they are judged to be roughly the same, the sample seal-imprint is registered after rotation or parallel movement. Calculating characteristics values of the registered and sample seal-imprints occurs in step S6. The sample is judged in detail according to characteristic values. Characteristic values here means: (i) the ratio of registered to sample seal-imprint pixels, (ii) identification ratio, (iii) blue ratio and (iv) faint and scratchy ratio. The area ratio, identification ratio, blue ratio, and faint and scratchy ratio are defined below.

Steps S0 to S7 are now explained in detail. (The imaging in step S0 is described later because it is also used in steps S1, S2, S3 and S5 for sample seal-imprint to obtain exact registered seal-imprint with least blue or faint and scratchy part. A registered seal-imprint is obtained in advance of steps I to VII below.)

I) Processing in Step S1

A sample seal-imprint is imaged by the CCD camera 11 with good contrast using blue light. The seal-imprint obtained in this way is input to the image processing system 30, converted to pixels, and displayed on the CRT of the seal-imprint display system 50. The image is inverted so that the seal-imprint is white and the background is black to facilitate observation by human eyes.

Since the ability of the CCD to receive light changes with time, errors may occur in a single image of a seal-imprint. Therefore, in the present embodiment, 32 images are taken. Accumulating addition of brightnesses (densities) is performed on the 32 seal-imprint images in the image processing system 30. A gray-level seal-imprint is obtained.

II) Processing in Step S2

Noise may be included on the paper which is not part of the real seal-imprint, but which is included in the image obtained in step S1. In Step S2, smoothing is performed by substituting the mean brightness of pixels in a 3×3 area for the brightness of the center pixel in the area. Consequently, noise in the image becomes disbursed. After that, an edge of a seal-imprint is sharpened by Sobel operator. Here, any method can be used for emphasizing an edge of an image, including methods other than a Sobel operator.

The image obtained in this way is binarized after deciding a threshold by a discrimination analysis method (or by another method). Swelling is performed 5 times by one pixel for each time. As a result, the characters in the seal-imprint are connected in one line, even when blurred, and faint and scratchy parts are included. Noise also swells and become large. Then the seal-imprint is labeled at every connected diagram—that is, each continuous configuration is given a label number, and the number is increased as the area of the configuration increases. Therefore, it is presumed that the configuration with the largest number comprises at least the seal-imprint, and configurations with smaller numbers are noise. Only the configurations with the largest number is left, and others are erased. Perpendicular and horizontal fillet diameters are calculated in the state and the rough area of the sample seal-imprint is decided according to the fillet diameters.

The parts outside of the area are all judged as background and erased recognizing all brightness points (pixels) to be noise (that is, brightness is made to be "0").

III) Processing in Sept S3

The area obtained in step S2 is placed upon the image of the seal-imprint obtained in step S1. That is, the image of the seal-imprint obtained in step S1 is surrounded by the area obtained in step S2: the brightness outside of the area is "0". Discrimination analysis is used to select a threshold using, as an index, a ratio of variances. The ratio is taken between the variance of pixel densities of pixels selected from within one class (such a the class of background pixels or the class of configuration pixels) and the variance of densities of pixels selected from both classes (such as a mixture of background and configuration pixels). The image of the sample seal-imprint is binarized using the threshold and converted into black and white levels. Other methods can be adopted for threshold determination.

IV) Processing in Step S4

Here, the areas of the sample seal-imprint and of the registered seal-imprint are compared. Area is compared by comparing the numbers of pixels of the seal-imprints in each image. When there is a large difference between the area of a sample seal-imprint and that of the registered one, the sample is judged to be different from registered one and seal-imprint verification is concluded without executing steps from S5 to S7. On the other hand, when there is a small difference between them, it is judged that a sample seal-imprint might possibly be the same as the registered one, steps S5 and above are executed.

A similar judgment is made with respect to maximal diameters. That is, when there is a large difference between the maximal diameter of the sample seal-imprint and that of registered one, the sample is judged to be different from the registered one and that seal-imprint verification is concluded. When there is a small difference between them, step 5 and subsequent steps are executed.

The value for judging difference between areas is (area of sample seal-imprint)/(areas of registered seal-imprint) ×100 The mean value of all samples m and the standard deviation σ are calculated. The upper limit of area difference is m+3σ and the lower limit is m−3σ. The limit (e.g. 3σ) can be changed according to necessity.

As for the maximal diameter, a sample image is imposed upon the registered image. The number of pixels which are spread outside of registered seal-imprint is calculated for all samples. Assuming that the maximal value among them is α, the maximal diameter of sample seal-imprint is Φ, and the maximal diameter of sample seal-imprint is φ, φ adopts (Φ+2α) as the standard value. That is, when φ is larger than (Φ+2α), the sample is judged to be different from the registered one. The limit (e.g. 2) can be also changed according to necessity.

V) Processing in Step S5

Figure 6:
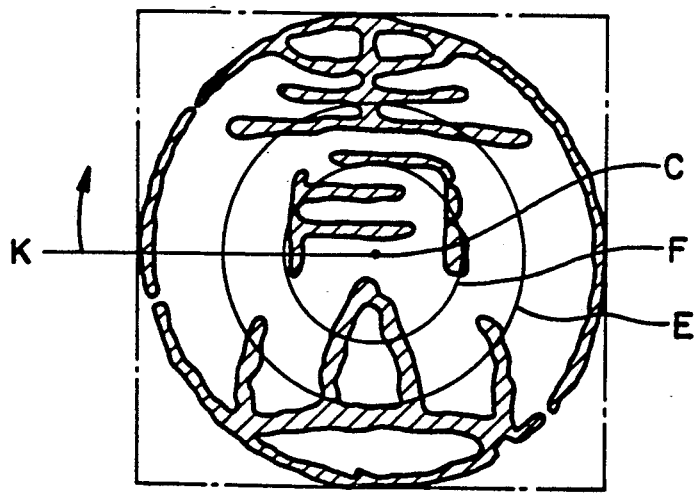
FIG. 6 shows an example of seal-imprint and circles along which a series of pixels is selected.

First, two concentric circles E and F with arbitrary radii are centered on the fillet center C as shown in FIG. 6. It is necessary that the radius of the outer circle is less than the value (in number of pixels) calculated below. (maximal length of registered seal-imprint/2)−5 For example, the radius of the outside circle E may be 50 pixels and the radius of inside circle F may be 40 pixels (from C of the center of fillet diameter).

Next, pixels of the registered seal-imprint on the outside and inside circle are extracted to acquire 1-dimensional spectra as shown in FIGS. 7 (a) and (b). FIG. 7 (a) is an example of a 1-dimensional spectrum showing each pixel of the outside circle E as scanned clockwise from standard line K. In the figure, hatched parts I show the existence of the pixel of registered seal-imprint and white parts J show the absence of a pixel of registered imprint. In the same way, FIG. 7 (b) shows a 1-dimensional spectrum of the inside circle F.

As for a sample seal-imprint, 1-dimensional spectra from circles are obtained in the same way. That is, they are obtained after drawing circles with radii of 50 pixels and 40 pixels from the center of the sample seal-imprint. FIG. 8 (a) shows an example of a 1-dimensional spectrum from the outside circle and FIG. 8 (b) shows an example of a 1-dimensional spectrum from the inside circle.

In the next step, the 1-dimensional spectrum A from the outside circle of the registered seal-imprint and the 1-dimensional spectrum B0 from the outside circle of the sample seal-imprint are placed upon and compared with on other to determine correspondence as shown in FIG. 1. That is, as to spectrums A and B0, the parts not in agreement are obtained by exclusive-or operation. In the figure, the pixels not in agreement are shown by arrows. The disagreement ratio is calculated by dividing the number of pixels with arrows, that is the number of pixels not in agreement by the number of all the pixels in circle E of registered seal-imprint.

After that, spectrum B1 is obtained, which is shifted 1 pixel to the right from the spectrum B0 of the sample seal-imprint. The disagreement ratio between spectrum B1 and spectrum A of the registered seal-imprint is calculated by the method described above. In the same way, disagreement ratios between A and additional shifted spectra of the sample seal-imprint are obtained sequentially. This operation is repeated until the sampled seal-imprint spectrum has been shifted Bn times (n is the number of pixels in the circle).

When n disagreement ratios have been obtained, these disagreement ratios are compared to one another and the minimal value is identified. The number of shifted pixels giving the ratio is converted into a rotation angle by the following formula.

$$\text{Rotation Angle} = (\text{Number of Shifted Pixels}) \times 360°/n$$

The rotation angle for comparing the sample seal-imprint with the registered seal-imprint is obtained in this way. That is, the value calculated by the formula is the rotation angle using the outside circle E as a standard.

Executing the same operation with respect to the inside circle F, the angle to be rotated for the sample seal-imprint is calculated with the inside circle F as the standard.

When differences occur between the rotation angles obtained from the outside and inside circles, the rotation angle with the lower disagreement ratio is adopted. The sample seal-imprint is rotated by the rotation angle. The rotation angle then is presumed to be $\theta 1$.

After the rotation, the sample seal-imprint is displaced in order to maximize the identification ratio (as defined in part VI) between the sample and registered seal-imprints. The parallel movement is explained here referring to FIG. 9 (a), (b), and FIG. 10.

In FIGS. 9 (a) and (b), a solid line M shows fillet diameters (horizontal and vertical outlines) of a registered seal-imprint. Chain line with one dot P and chain line with two dots N show horizontal and vertical center liens of a registered seal-imprint, and fillet diameters of sample seal-imprint, respectively.

As shown in FIG. 9 (a), a sample seal imprint is placed by taking the position for the center of the upper horizontal fillet diameter of the sample seal-imprint to be 5 pixels above the upper horizontal fillet diameter of the registered seal-imprint. The number of matching pixels between the sample seal-imprint and registered one is counted. Displacing the sample seal-imprint to a position 3 pixels below the registered one, the number of matching pixels is counted. In the same way, moving the sample seal-imprint to a position 3 pixels below, the number of matching pixels is counted. This process is repeated until the center of the horizontal fillet diameter N2 on the lower side of sample seal-imprint is placed 5 pixels below the center of the horizontal fillet diameter M2 on lower side of registered seal-imprint.

Next, as shown in FIG. 9 (b), the number of matching pixels is counted by placing the sample seal-imprint on a location such that the center of the vertical fillet diameter N3 (on left side of the sample seal-imprint) is 5 pixels left of the center of the vertical fillet diameter M3 (on the left side of registered seal-imprint). The number of matching pixels is calculated again by displacing the registered seal-imprint rightward by 3 pixels. This process repeats until the center of the vertical fillet diameter N4 on the right side of sample seal-imprint comes to a position 5 pixels to the right of the center of the vertical fillet diameter M4 on the right side of registered seal-imprint. The location "a" of the sample seal-imprint having the maximal identification ratio is obtained.

After that, as shown in FIG. 10, the sample seal-imprint is moved with respect to 8 pixels in area Q, which is a neighborhood of 1 pixel around in the center of "a". The identification ratio between the pixels in the sample seal-imprint and the registered one is calculated for each move.

That is, the sample seal-imprint is moved 1 pixel to the left such that a pixel which occupied location "a" before the move occupies position "b" after the move, and the identification ratio between the sample and the registered images is calculated. Next, the sample is moved such that the pixel in location "b" occupies location "c" and the identification ratio is calculated. The sample seal-imprint is moved such that the pixel initially in location "a" is moved to locations "d", "e", "f", "g", "h" and "i" in sequence, and the identification ratio at each location is calculated. When the identification ratio at location "a" is larger than at locations "b" to "i", the parallel movement is concluded.

When one of the locations "b" to "i" has an identification ratio larger than that of location "a", the sample seal-imprint is moved to the location with the largest identification ratio and the process repeats around each location. If "e" is such a location, the sample seal-imprint is moved to "j", "k", "l", "m" and "n" using location "e" as the center. The identification ratio for each location is calculated. When the identification ratio for "e" is larger than any value from that on "j" to "n", parallel movement of sample seal-imprint is concluded on "e".

If a location around "e", such as "k", has an identification ratio larger than that of "e", the sample seal-imprint is moved to "o", "k" to "p" and "q" sequentially. Identification ratios for each location are calculated. When the identification ratio on "k" is the most largest among those on "o" to "q", parallel movement is concluded on "k".

When there is some location with an identification ratio larger than that of "k", the location with the largest ratio becomes the new center point. The identification ratios for the locations in a 1 pixel neighborhood around the new center point are calculated.

Continuing the operations above, the location with the largest identification ratio between the registered and a sample seal-imprint is found, and this concludes parallel movement. The movement distance right or left is taken to be X1, and movement up or down is taken to be Y1.

After concluding rotation and parallel movement, rotation and parallel movements are repeated and fine adjustment for positioning is executed. For fine adjustment, the centers of circles E and F are the center of the fillet diagram of the registered seal-imprint as to a sample seal-imprint. Therefore, as to the rotation of the sample seal-imprint, the identification ratio between it and the registered one is calculated by rotating it on the axis of the center of the fillet diagram of the registered one. Parallel displacement is calculated from the center. The rotating angle, movement distance to the right or left and movement distance up or down are designated as $\theta_2$, X2 and Y2.

In the present embodiment, 2 angles and 2 parallel movement distances are determined by executing rotation and parallel movement twice. Two rotation angles $\theta_1$ and $\theta_2$ are added together, and the value after the addition is the total rotation angle given to sample seal-imprint. Similarly, rightward or leftward parallel movement quantities X1 and X2 are added together, and also, upward or downward parallel movement quantity Y1 and Y2 are added together. These values, after addition, are the parallel movement quantities of the sample seal-imprint in the total right or left direction and up or down direction.

The binarized sample seal-imprint obtained in step S3 is placed on the registered one by rotating and displacing it by the following amounts $$(\theta_1+\theta_2), (X1+X2), (Y1+Y2)$$

This process of rotation and parallel movement of the sample seal-imprint is completed once. Consequently, it prevents the generation of error from quantization.

It is also possible to place a sample seal-imprint on a registered one through the process of:

1) rotating the CCD camera by an angle of $(\theta_1+\theta_2)$, and displacing the camera by distances $(X1+X2)$ and $(Y1+Y2)$; and ii) obtaining a new binarized sample by performing steps S1 to S3.

Errors from quantization are not generated in this case.

It is also possible to place a sample seal-imprint on a registered one through the process of:

i) rotating the CCD camera once by the angle $\theta_1$ and displacing the camera by a distance of X1 and Y1, as the values $\theta_1$, X1 and Y1 are obtained;

ii) obtaining a binarized sample seal-imprint by performing steps S1 to S3;

iii) calculating $\theta_2$, X2 and Y2 from the sample obtained in ii); and iv) obtaining a new binarized sample seal-imprint by performing steps S1 and S3 after moving the CCD camera by $\theta_2$, X2 and Y2.

Quantization error is not generated in this case either.

The results of step 5 (rotation and displacement) can be checked before proceeding to step 6. A fillet diameter surrounding the seal-imprint placed on another is drawn. The fillet diagram is divided equally in three sections from the top to the bottom, and each section is divided equally in three parts from the right to the left. That is, the fillet diagram is divided equally in nine parts. Both seal-imprints are divided into nine parts. The area ratio between each divided part of the registered seal-imprint and the sample seal-imprint is calculated. When the nine area ratios calculated in this way are within upper and lower limits for the area ratio used in step S4, the processing goes forward to step S6. When at least on of the nine area ratios is out of the range for area ratios used in step S4, the processing is concluded. This test checks losses, and verification is not performed when there are too many losses. Of course, the number of divisions and the limits for area ratio in each small part can be changed according to necessity.

VI) Processing in Step S6

In step S6, characteristic values of a registered seal-imprint and a sample on are measured. The characteristics values are: (i) mean area ratio (to check the characteristics in general); (ii) identification ratio (master); (iii) identification ratio (itself); (iv) blur ration (master); (v) blur ratio (itself); (vi) faint and scratchy ratio (master); (vii) faint and scratchy ratio (itself); and (viii) coefficient of blur on swelling (to check in detail the difference of stroke in a character included in a seal-imprint). These characteristics are defined below.

The number of pixels with agreement is the total number of overlapped pixels when a sample seal-imprint is placed on the registered one. The number of pixels with blur is the total number of pixels in sample seal-imprint when a sample seal-imprint is placed on the registered one. The number of faint and scratchy pixels is the total number of pixels without overlapping when a sample seal-imprint is placed on the registered one. The number of pixels in the sample seal-imprint and the number for the registered one are designated S and T, respectively.

In the following formulae, the values are in "%". "Master" in parentheses refers to a ratio of a number of pixels with respect to the number of pixels of the registered seal-imprint. "Itself" refers to a ratio of a number of pixels with respect to the number of pixels of the sample seal-imprint.

```
Area Ratio = (S/T) × 100
Identification Ratio (master) =
    (number of pixels with agreement/T) × 100
Identification Ratio (itself) =
    (number of pixels with agreement/S) × 100
Blur ratio (master) = (number of blur pixels/T) × 100
Blur ratio (itself) = (number of blur pixels/S) × 100
Faint and Scratchy Ratio (master) =
    (number of faint and scratchy pixels/T) × 100
Faint and Scratchy Ratio (itself) =
    (number of faint and scratchy pixels/S) × 100
```

The faint and scratchy coefficient is calculated by the next formula after swelling the registered seal-imprint as 1 pixel 8 times and calculating the number of blur pixels included in each swelling layer in the state of overlapping the registered seal-imprint and sample 80.

```
Coefficient of Swelling and Blur in n-the Layer =
    (number of pixels with agreement + number of blur
    pixels from swelling first layer to swelled n-the
    layer)/(number of pixels in sample seal-imprint) × 100
```

Figure 11:
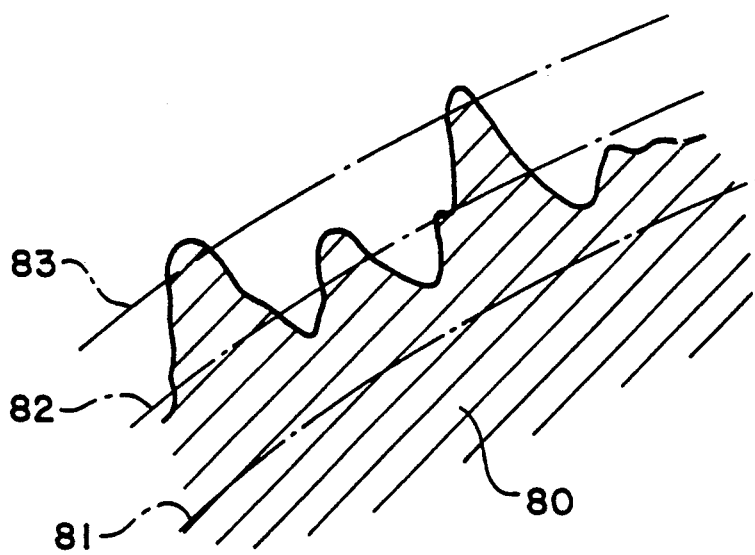
FIG. 11 shows a sample seal-imprint and registered one to be swelled.

This formula is computed for values at n from 1 to 8. Swelled and blur coefficients are calculated in each swelled layer (from the first to the eighth). (cf. FIG. 11)

VII Processing in Step S7

The blur or faint and scratchy states of a sample seal-imprint and a corresponding registered one would be similar when the manner of sealing is similar (that is, when the quantity of ink and the pressure to seal are almost the same). Therefore, a certain relationship can be found by gathering seal-imprints made with similar way of sealing and determining statistical characteristics for each quantity defined above.

To determine the statistical relationships, the following steps are carried out:

i) characteristic values mentioned in step S6 are determined for a large number of sample seal-imprints by performing steps from S1 to S6 on each sample;

ii) clustering is performed (classification in types) on the characteristic values obtained in i) by a cluster analysis for each of 3 parameter sets:
(a) Identification Ratio (master and itself);
(b) Area Ratio;
(c) Blur Ratio (master and itself) and Faint and Scratchy Ratio (master and itself).

The mean distribution of characteristic values in each cluster, that is, "standard data", is obtained.

A sample seal-imprint is judged to correspond to a registered one when the characteristic values are within certain ranges—it is not judged to correspond to the registered one when the characteristic values are out of the ranges.

Figure 12:
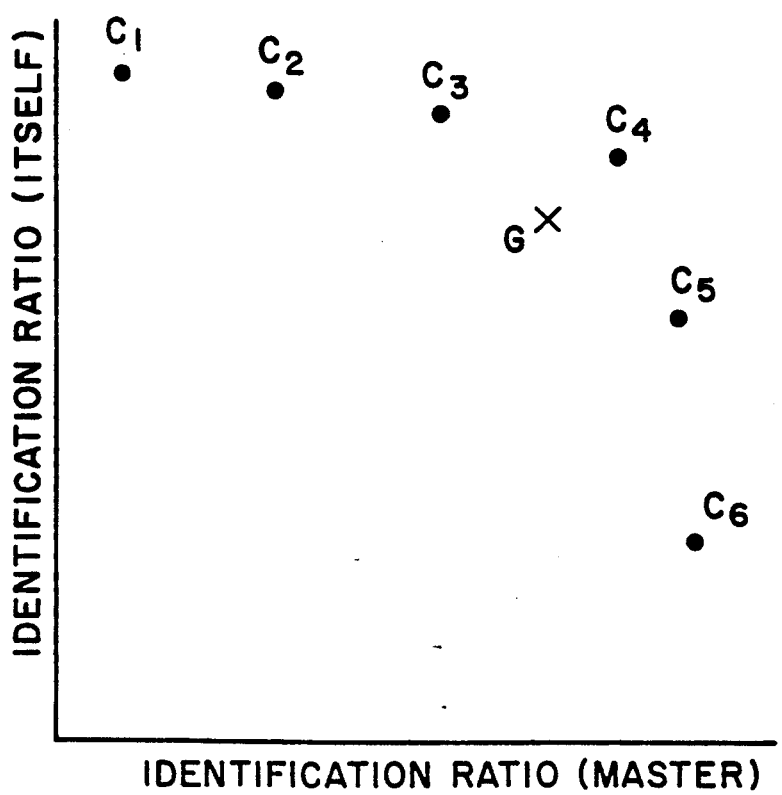
FIG. 12 shows clustering of standard data based on identification ratios of a sample seal-imprint corresponding and a registered one.

In the present embodiment, the judgment of characteristics values involves 3 units. Unit 1 selects a first cluster of previously processed samples based on the identification ratios of the sample under evaluation. FIG. 12 shows a relationship between identification ratios (Master and Itself). Six points C1–C6 represent mean values for six clusters of previously processed seal imprints. (Formation of clusters from previously processed samples is discussed below.) A point G represents identification ratios for a sample seal imprint under evaluation. Unit 1 identifies the cluster having a minimum distance (e.g. a Euclidean distance) to the sample under evaluation. For the example shown, cluster C4 is closest. For the selected cluster, Unit 1 compares other characteristic values of the sample under evaluation (values of area ratio, blur ratios, faint and scratchy ratios, and swelling blur coefficients) against statistical limits associated with the selected cluster. Table I lists exemplary mean values and standard deviations for these other characteristics (except swelling blur which is discussed separately below).

TABLE 1

| | Mean Value | Standard Deviation |
|---|---|---|
| Area Ratio | 118.6 | 5.0 |
| Blur Ratio (Master) | 21.8 | 3.1 |
| Blur Ratio (Itself) | 18.3 | 2.4 |
| Faint and Scratchy Ratio (Master) | 2.7 | 2.2 |
| Faint and Scratchy Ratio (Itself) | 2.2 | 1.8 |

In the present embodiment, blur ratios and faint and scratchy ratios of the sample seal-imprint and the registered one are evaluated to determine whether (or not) they are within a range of 3 times the standard deviation of the mean value. (That is, it is judged if they are within the range of 3 sigma of the mean). For example, when the area ratio is 122.6, blur ratio (master) is 22.6, blur ratio (itself) 17.2, faint and scratchy ratio (master) is 4.3, and faint and scratchy ratio (itself) is 3.9, they are all in the ranges and the sample seal-imprint is taken to correspond to the registered seal-imprint. When at least one of them is out of the range, however, the sample seal-imprint is not judged to correspond to the registered one.

After the judgment above, swelling blur coefficient is examined. For examples to the n-the layer in FIG. 11, assuming line 83 is adopted, the swelling blur coefficient is calculated, as shown in step S6, by adding the total number of pixels in layers 81 to 83 to the number of pixels of identification, and dividing the result by the total number of pixels in the sample seal-imprint, then multiplying the result by 100. The coefficient calculates the standard deviation which shows the mean value and the distribution in every cluster and in every layer from the first to the eighth. For example, swelling blur coefficients in cluster C4 may be as shown in TABLE 2.

TABLE 2

| | Swelling Blur Coefficient | |
|---|---|---|
| | Mean Value | Standard Deviation |
| 1st Layer | 93.0% | 3.6 |
| 2nd Layer | 98.8% | 1.2 |
| 3rd Layer | 99.8% | 0.4 |

TABLE 2-continued

| | Swelling Blur Coefficient Mean Value | Standard Deviation |
|---|---|---|
| 4th Layer | 99.9% | 0.2 |
| 5th Layer | 100.0% | 0.1 |
| 6th Layer | 100.0% | 0.05 |
| 7th Layer | 100.0% | 0.02 |
| 8th Layer | 100.0% | 0.01 |

In the present embodiment, the swelling blur coefficient in each layer for the sample seal-imprint is examined to determine whether it is within three standard deviations of the mean values shown in TABLE 2. When all swelling blur coefficients of the sample seal-imprint are within the range of standard values, the sample seal-imprint is judged to correspond to the registered one. On the other hand, if at least one of swelling blur coefficients (of 8) is out of the range, it is judged that there is a possibility of no correspondence between the sample seal-imprint and registered one.

Unit 2 selects a second cluster of previously processed samples based on the area ratio of the sample under evaluation. For the selected cluster, Unit 2 compares other characteristic values of the sample under evaluation (values of identification ratios, blur ratios, faint and scratchy ratios, and swelling blur coefficients) against statistical limits for the selected cluster.

The judgment for area ratio in unit 2 is similar to the judgment in unit 1 for identification ratios. When all of identification ratios (master and itself), blur ratios (master and itself) and faint and scratchy ratios (master and itself) are within the standard values, the sample seal-imprint is judged to be the same as the registered one. When at least one of them is out of the standards value, the sample seal-imprint is judged to be different from the registered one. In the next step, swelling blur coefficients ar examined. The examination is similar to that in unit 1. When all 8 swelling blur coefficients are within range, the sample seal-imprint is judged to be the same as the registered one. When at least one of them is out of the range of standard value, the sample seal-imprint is judged to have the possibility of differing from the registered one.

Unit 3 selects a third cluster of previously processed samples based on the blur ratios and faint and scratchy ratios of the sample under evaluation. For the selected cluster, Unit 3 compares other characteristic values of the sample under evaluation (values of identification ratios, area ratio, and 8 swelling blur coefficients) against statistical limits for the selected cluster. The judgment is the same as in units 1 and 2, i.e., whether sample seal-imprint corresponds to the registered one or not, and whether there is a possibility that the sample seal-imprint is quite different from the registered one.

Units 1 to 3 make separate judgments based on (i) identification ratios (of master and itself), (ii) area ratio, and (iii) blur ratios (of master and itself) and faint and scratchy ratios (of master and itself), respectively. Final judgment is executed as follows:

1. A sample seal-imprint is judged to be the same as the registered one when all general views of judgments from units 1 to 3 are accepted, that is, the characteristic values of a sample seal-imprint are within the standard value, and all the detailed judgments for differences of strokes (swelling blur coefficients) are accepted.

2. A sample seal-imprint is judged to be different from the registered seal-imprint when at least one of general view of judgments from unit 1 to 3 is not accepted (that is, (a) characteristics value(s) is/are out of the range of standard value).

3. A sample seal-imprint is judged to have the possibility of differing from the registered one when at least one of the detailed standards of judgment (swelling blur coefficients) is not accepted.

Final judgment is completed in step S7. The number of clusters used in the judgments may be selected according to desired judgment precision.

Clusters are described below with reference to FIGS. 13 and 14. These diagrams show the relationship between blur ratio (master) and faint and scratchy ratio (master) for many sample seal-imprints corresponding to a registered one. Each point shows data of blur ratio and faint and scratchy ratio for a sample. Ellipses D show clusters. The abscissa of the center point in each cluster is the mean value of blur ratio of data of samples in the cluster. The ordinate of each center point is the mean value of faint and scratchy ratio of data in the cluster. The size of each ellipse is decided by taking a major diameter or a minor diameter with the length of 3 times of standard deviation (in plus and minus directions) though the middle of the mean value of blur ratio, and by taking major diameter or minor diameter with the length of 3 times of standard deviation (in plus and minus directions) through the middle of the mean value of the faint and scratchy ratio.

Figure 13:
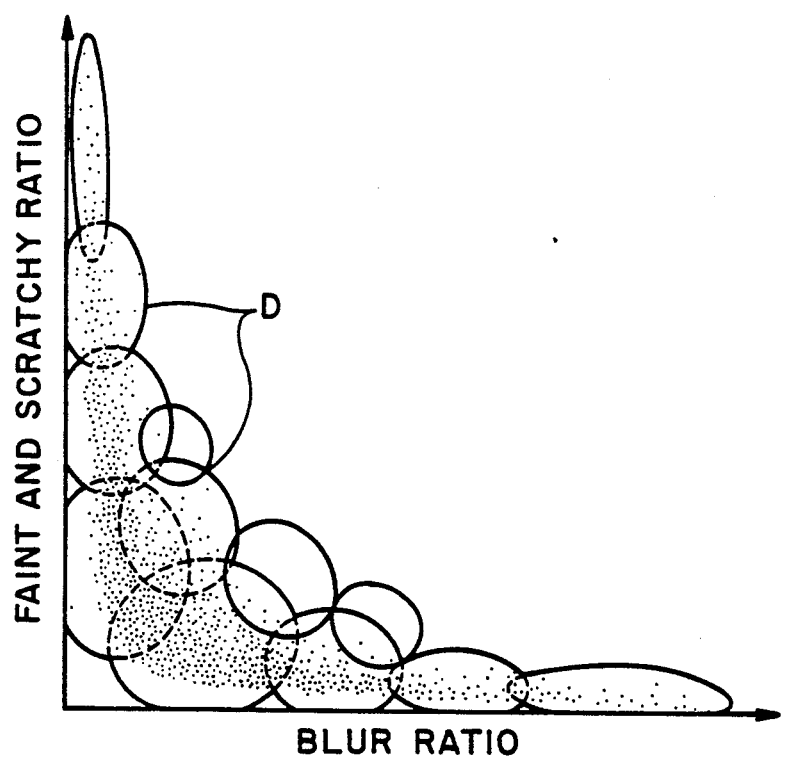
FIG. 13 shows a relationship between blur ratio and faint and scratchy ratio for 12 clusters.
Figure 14:
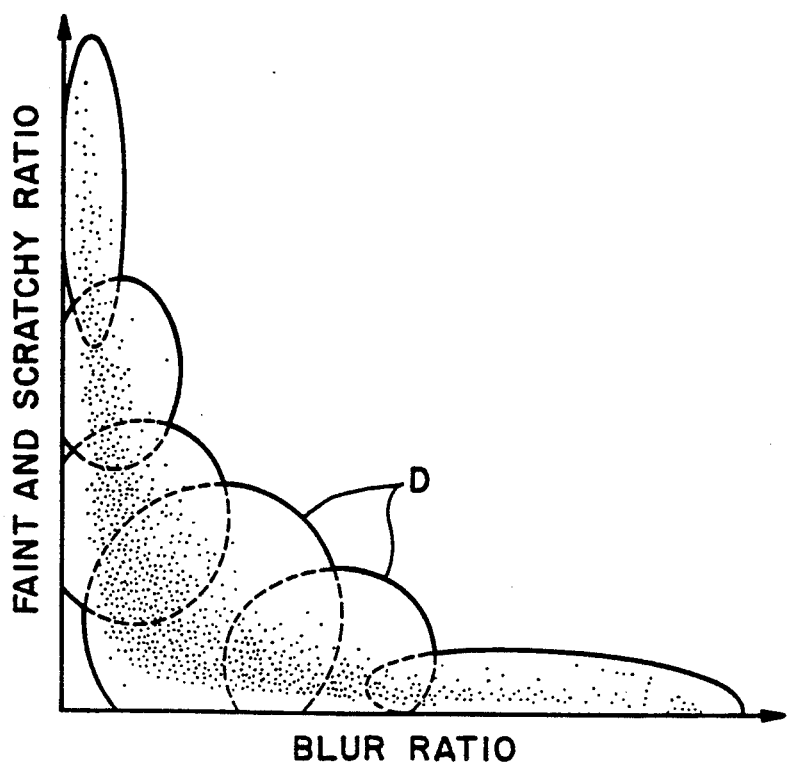
FIG. 14 shows a relationship between blur ratio and faint and scratchy ratio for clusters.

As understood from FIGS. 13 and 14, samples having a lower blur ratio have a higher faint and scratchy ratio. Comparing FIG. 13 (with 12 clusters) and FIG. 14 (with 6 clusters), it is clear that as the number of clusters increase, the area of a cluster becomes smaller. As a result, the area surrounded by the clusters becomes smaller. That is, the greater the number of clusters, the shorter are the lengths of major and minor diameters in clusters. Therefore, the greater the number of clusters, the more difficult is the verification of a seal-imprint. The fewer the number of clusters, the easier is the verification.

VIII Processing Step S0

The method for obtaining a registered seal-imprints is described below. It uses steps S1, S2, S3 and S5 applied to a reference seal-imprints.

First, 4 (for example) clear seal-imprints are selected. The first seal-imprint is imaged by the CCD camera (as in step S1). That is, it is imaged 32 times and a gray-level image is obtained by accumulating addition of the 32 of the images. An area is retained by clearing the image in the same way in step S2. Overlapping this area with the image obtained in step S1, the image outside of the area is deleted and the image inside of the area is binarized in the same way in step S3. Consequently, a gray-level image and a binarized image of the first seal-imprint are obtained.

Next, a binarized image of the second seal-imprint is obtained by executing steps S1, S2 and S3 in the same manner as for the first one. This is the second processed imprint. The second binarized imprint is overlapped with the first binarized imprint and their locations are adjusted by rotation or displacement as in step S5. The gray-level image of the second seal-imprint is moved with the angle and length obtained here on the gray-level image of the first seal-imprint.

The gray-level images of the third and the fourth seal-imprint are sequentially overlapped on the gray-levels of the first seal-imprint.

Here, the locations of the gray-level images from the first to the fourth seal-imprint are adjusted relative to each other: the on obtained in such a way is the gray-level image of the registered seal-imprint. The binarized image of the registered seal-imprint is obtained by performing step S2 to step S3. The binarized one is the standard use to verify sample seal-imprint.

In this embodiment, the number of overlapped seal-imprints is 4. Any number will do in practical use.

As mentioned above, it is possible to adjust locations of sample seal-imprint and registered one in a short time. Consequently, it is possible to shorten the time for verifying seal-imprints.

What is claimed is:

1. A position adjustment system comprising:
   means for generating pixel images;
   means for extracting a first ordered sequence of pixels from along a first circle in a first image of said pixel images;
   means for extracting a second ordered sequence of pixels from along a second circle in a second image of said pixel images;
   means for shifting the first and second ordered sequences one relative to the other by amounts which correspond to angles of relative rotation between the first and second images;
   means for comparing individual pixels of the first and second ordered sequences and for detecting an amount of shift for which a measure of correspondence between the first and second sets of pixels is a maximum;
   means for rotating said first and second images one relative to the other by an angle corresponding to a shift amount for which the first and second sets of pixels have a maximum correspondence; and
   means for rotating said means for generating images by an angle corresponding to the shift amount for which the first and second sets of pixels have a maximum correspondence.

2. A system as in claim 1, wherein said comparing and detecting means includes exclusive-or means for identifying differences of individual pixels in the first and second sequences of pixels.

3. A position adjustment system as in claim 1 further comprising:
   means for displacing the first and second images relative to each other;
   means for detecting an amount of displacement for which an identification ratio of said first and second images is a maximum; and
   means for displacing said means for generating images by an amount for which the first and second images have a maximum identification ratio.

4. A method for aligning images of first and second objects comprising steps of:
   generating a first pixel image of the first object;
   generating a second pixel image of the second object;
   selecting a first ordered set of pixels from a first closed contour of in the first image;
   selecting a second ordered set of pixels from a second closed contour in the second image;
   shifting the first and second ordered sets of pixels relative to one another a plurality of times, each shift corresponding to a relative angle of rotation of the first and second images relative to one another;
   for each shift, measuring a degree of concurrence between individual pixels in their respective orders in the first and second ordered sets of pixels;
   identifying a first angle of rotation for which the concurrence between the shifted first and second sets of pixels is a maximum; and
   generating a third image rotated relative to the first image by the identified angle, thereby generating a third image aligned with the second image.

5. A method as in claim 4 further comprising the steps of:
   selecting a third ordered set of pixels from a third closed contour in the first image;
   selecting a fourth ordered set of pixels from a fourth closed contour in the second image;
   shifting the third and fourth ordered sets of pixels relative to one another a plurality of times, each shift corresponding to a relative angle of rotation of the first and second images relative to one another;
   for each shift, measuring a degree of concurrence between individual pixels in their respective orders the third and fourth ordered sets of pixels;
   identifying a second angle of rotation for which the concurrence between the shifted third and fourth sets of pixels is a maximum; and
   rotating the first and second images relative to one another by one of the first and second identified relative angles.

6. A method as in claim 4 further comprising steps of:
   displacing the first and second images relative to one another;
   for each displacement, measure a degree of coincidence between the displaced first and second images;
   identifying a displacement for which the coincidence between the displaced first and second images is a maximum; and
   generating a third image rotated relative to the first image by the identified angle and displaced by the identified displacement, thereby generating a third image aligned with the second image.

7. A method as in claim 6 further comprising steps of:
   comparing the rotated and displaced first and third images to verify a degree of match between the first and second objects.

8. A method as in claim 7 wherein the step of comparing the first and third images includes a step of measuring an area ratio of the first and second images.

9. A method as in claim 7 wherein the step of comparing the first and third images includes a step of measuring an identification ratio of the first and second images.

10. A method as in claim 7 wherein the step of comparing the first and third images includes a step of measuring a blue ratio of the first and second images.

11. A method as in claim 7 wherein the step of comparing the first and third images includes a step of measuring a ratio of faintness and scratchiness of the first and second images.

12. A method as in claim 7 wherein the step of comparing the first and third images includes a step of measuring a coefficient of swelling blue of the first and second images.

* * * * *